United States Patent
Crochon et al.

(10) Patent No.: US 6,954,496 B2
(45) Date of Patent: Oct. 11, 2005

(54) METHOD FOR TRANSMITTING DATA FROM AN INTERROGATING DEVICE TO PORTABLE OBJECTS

(75) Inventors: Elisabeth Crochon, Poisat (FR); Thierry Thomas, Varces (FR); Mathieu Bouvier Des Noes, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 793 days.

(21) Appl. No.: 09/926,039

(22) PCT Filed: Dec. 19, 2000

(86) PCT No.: PCT/FR00/03589

§ 371 (c)(1),
(2), (4) Date: Aug. 20, 2001

(87) PCT Pub. No.: WO01/47201

PCT Pub. Date: Jun. 28, 2001

(65) Prior Publication Data

US 2003/0086506 A1    May 8, 2003

(30) Foreign Application Priority Data

Dec. 20, 1999   (FR) .................................. 99 16067

(51) Int. Cl.$^7$ .............................................. H03K 7/04
(52) U.S. Cl. ...................................... 375/239; 340/10.3
(58) Field of Search ................................ 375/364, 365, 375/368, 369; 340/10.3

(56) References Cited

U.S. PATENT DOCUMENTS 4,225,888 A * 9/1980 Takayama et al. .......... 358/409
5,684,871 A   11/1997 Devon et al.
5,844,942 A * 12/1998 Hicks et al. ................ 375/239

FOREIGN PATENT DOCUMENTS

EP          0 681 192          11/1995

* cited by examiner

*Primary Examiner*—Mohammed Ghayour
*Assistant Examiner*—Freshteh Aghdam
(74) *Attorney, Agent, or Firm*—Oblon, Spivak, McClelland, Maier & Neustadt, P.C.

(57) ABSTRACT

A method of information transmission from an interrogator system to portable objects. The information is transmitted through ternary amplitude modulation and positional pulse coding. A frame is made up of a Start Of Frame (SOF) marker made up of two like-polarity pulses, patterns that transmit binary symbols and are composed of two opposite-polarity pulses, and lastly an End Of Frame (EOF) marker that is made up only of a single pulse. The present invention is notably intended for interrogating radio frequency (RFID) tags.

14 Claims, 3 Drawing Sheets

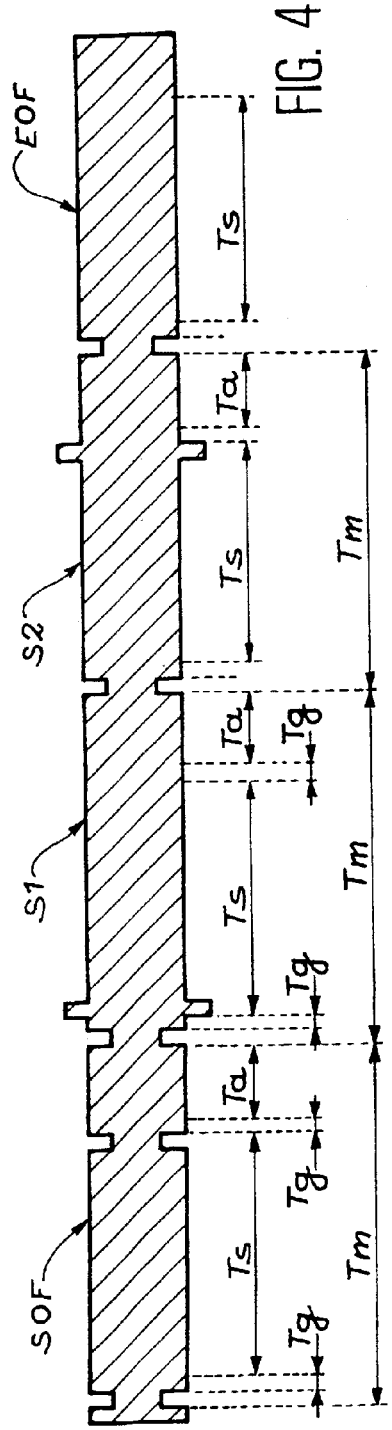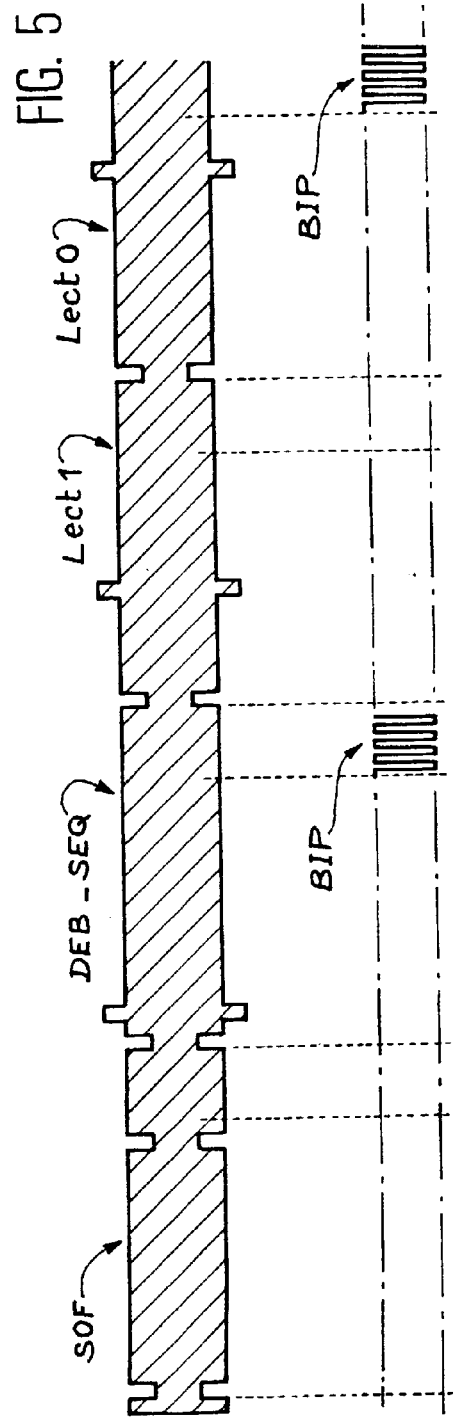

METHOD FOR TRANSMITTING DATA FROM AN INTERROGATING DEVICE TO PORTABLE OBJECTS

FIELD OF THE INVENTION

The purpose of the present invention is to provide a method of transmitting information from an interrogator system to portable objects.

It is suitable for the teleticketing, mass production, object sorting and access control fields and, more generally, for applications that do not need the same characteristics in terms of range, binary throughput, noise resistance or radio transmission standards compliance, depending on the phase in which the portable object is used. These characteristics may change, for example, between a high dataflow individual initialisation phase and lower dataflow identification phases.

In the preferred embodiment of the present invention, the portable objects are radio frequency (RFID) tags.

BACKGROUND OF THE INVENTION

Certain standards are currently being drawn up to standardise the transmission of information from an interrogator system to portable objects such as radio frequency tags. These standards or draft standards generally recommend carrier wave amplitude modulation for certain time intervals coupled with positional coding of the intervals; however the techniques defined in these standards cause certain problems, notably in detecting the interval positions. They also create difficulties when tags operate asynchronously, i.e. contain their own local oscillator that operates independently of the carrier wave frequency.

The aim of the present invention is to solve precisely these problems.

DESCRIPTION OF THE INVENTION

To precisely detect the position of the modulation intervals (which we will call "pulses" elsewhere in this document), the present invention advocates forming a first pulse that acts as a reference and a second pulse whose position is detected relative to the first's position, with the second frame's position defining which information is transmitted. Any potential confusion between the first and second pulses in the flow of pulses from the interrogator to the tags must therefore be avoided. The present invention therefore proposes to distinguish between them by using ternary (rather than binary) carrier wave amplitude modulation, allowing two different modulations, each of which is allocated to one of the pulse types, to be used.

To be more precise, the purpose of the present invention is to provide a method for transmitting information from an interrogator system to portable objects; in this method the information is transmitted through carrier radio wave amplitude modulation over several time intervals called "pulses" and positional coding of those pulses, the characteristics of which are as follows:

ternary amplitude modulation is used in which the first amplitude level is used with a second level below the first and a third level above the first, whereby the modulation either passes from the first level to the second (and is then called negative polarity) or from the first level to the third (and is then called positive polarity);

positional coding is obtained by forming two opposite-polarity pulses, in which the position concerned is that of the second pulse relative to the first.

The information is preferably grouped into messages made up of a series of patterns in which each pattern is associated with an information symbol. Each pattern is therefore made up of a coding time area divided into N identical time units, each lasting for duration $T_c$, where $T_c$ is at least equal to the pulse duration and the first pulse is placed before this time area and the second is placed in any one of the area's N time units.

The number of time units (N) preferably equals $2^M$, where M is an integer; the information symbol transmitted by each pattern then consists in a binary word containing M bits.

To ease restrictions on pulse width, a first guard time, the duration of which is a multiple of time unit $T_c$, should be inserted between the first pulse and the beginning of the coding time area.

A second guard time, the duration of which is also a multiple of time unit $T_c$ should also be inserted after the coding time area.

The risk of two pulses immediately following each another is completely avoided through these guard times, making it easier to detect a transition between a positive polarity pulse and a negative polarity pulse.

It would also be useful to position a wait time after the coding time area. The length of this wait time is ignored by the tag, which waits as long as necessary for the pattern's start pulse. This wait time may be modified depending on the pattern, depending on the transmitted information and the transmission distance. This wait time is also useful for complying with certain standards as the mean power level of the transmission spectrum's side bands can then be reduced, as this must remain below the authorised limit relative to the carrier wave's power level. This problem can be avoided by adjusting the wait time.

The wait time may therefore vary depending on:
local transmission standards
the interrogator system structure
the transmission protocol (or procedure) between the interrogator system and the tags
the application (short or long distance, noise resistance, compliance with standards, and binary dataflow).

As is often the case with these techniques, the message may be organised in frames, each of which is made up of a first pattern called the Start Of Frame marker, some information patterns and a final pattern called the End Of Frame marker. In the present invention, the Start Of Frame marker is made up of two like-polarity pulses. This pattern therefore does not correspond to an information pattern, as such a pattern requires differing polarities for the pulses. The Start Of Frame marker can therefore be easily distinguished from other patterns. One advantage of such a marker is that it provides the tag with a time yardstick, so enabling it to estimate the length of the coding time area intervals. This advantage is especially useful with asynchronous tags that contain a local oscillator operating independently of the carrier wave frequency.

The End Of Frame marker, in turn, can consist in a single pulse, so also distinguishing it from an information pattern.

In all these variations, the polarity of Start Of Frame marker, End Of Frame marker or information pattern pulses should preferably be negative as the carrier wave's amplitude is reduced by modulation as a result. The reversing of all polarities would not exceed the scope of the present invention, however.

BRIEF DESCRIPTION OF THE DRAWINGS

FIG. 4 shows a frame that includes a wait time and guard times;

FIG. 5 shows an example transaction that includes message interlacing.

DETAILED DESCRIPTION OF THE PREFERRED EMBODIMENT

Figure 1:
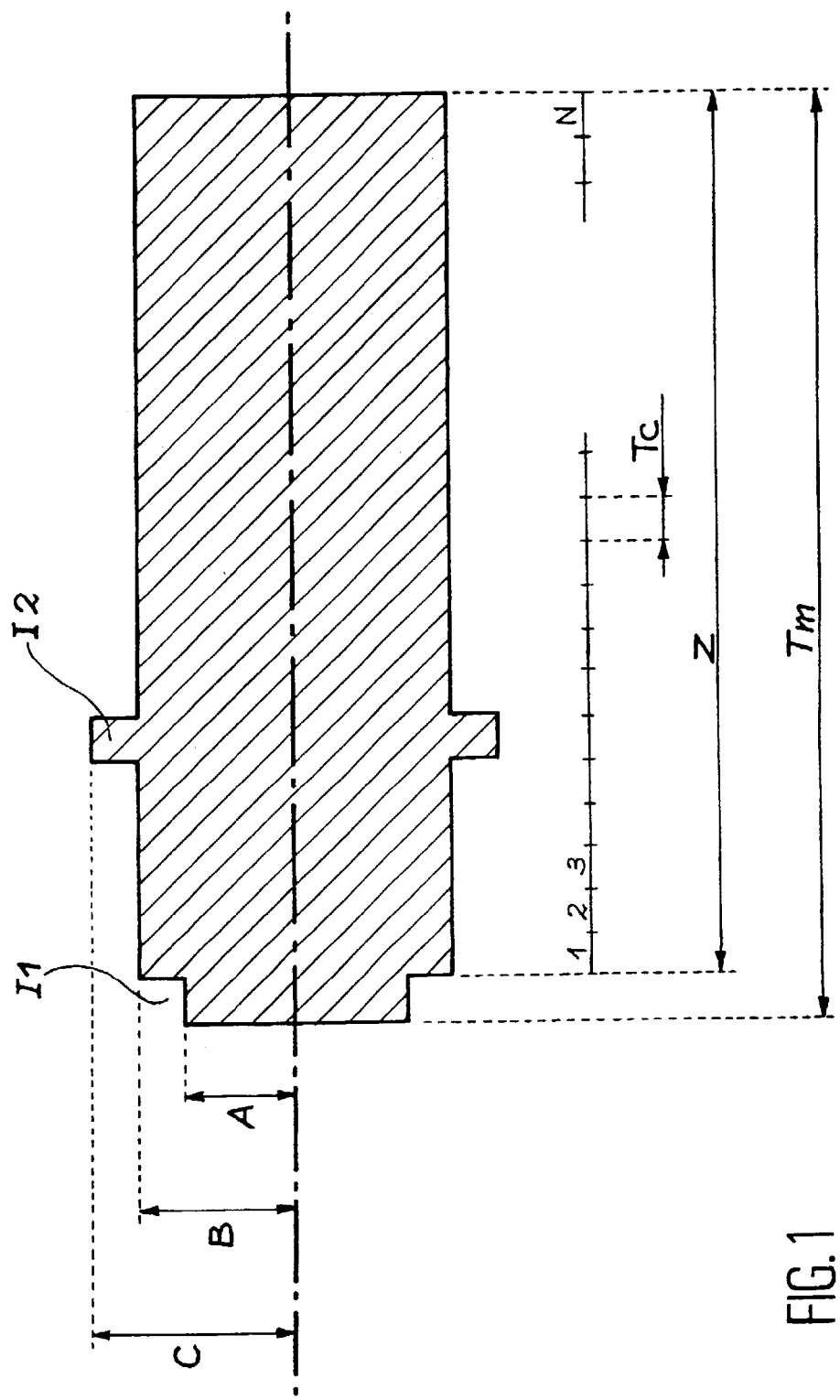
FIG. 1 shows a pattern representing an information symbol.

FIG. 1 contains a pattern corresponding to an information symbol. The crosshatched area represents the carrier radio wave's amplitude. The pattern shown is made up of a first, negative polarity, pulse ($I_1$), in other words one with a negative modulation index and a second, positive polarity, pulse ($I_2$), in other words one with a positive modulation index. It should be remembered that a modulation index is defined as the ratio between the variation in carrier wave levels and the sum of the carrier wave levels. By referring to the carrier wave's three possible amplitudes as A, B and C, where A<B<C, we can obtain two modulation indices of positive and negative polarity respectively, in a ternary modulation:

$$m^- = (B-A)/(A+B)$$

$$m^+ = (C-B)/(C+B)$$

For example, if carrier wave frequency $f_0 = 13.56$ MHz, we may obtain $m^- = m^+ = 10\%$; however, the index may be as high as 50% for example.

The pattern shown in FIG. 1 is made up of a coding time area (Z) divided into N intervals, each of $T_c$ length. There are therefore N positioning possibilities for $I_2$, the second pulse. If $N=2^M$, where M is an integer, this corresponds to a binary symbol containing M bits. If M=4, for example, we obtain N=16 and 4-bit symbols.

Coding time area Z is preceded by pulse $I_1$, and the position of $I_2$ relative to $I_1$, which is counted by the number of $T_c$ periods, provides the symbol's value.

The information may be coded in any way. We can, for example, assign a binary symbol to each $I_2$ position that only differs from the corresponding symbol in the adjoining position by one bit, using "Gray" coding; however, any other coding method may equally be used.

Period $T_c$, also called "chip", is preferably equal to $nT_0$, where $T_0$ is the carrier wave length and $T_0 = 1/f_0$. For example, if $f_0 = 13.56$ MHz we can say that n=128, giving a $T_c$ of 9.4 µs.

The pattern's total length is given as $T_m$. If N=16 and $T_c = 9.4$ µs, we obtain $T_m = 159.8$ µs.

Figure 2:
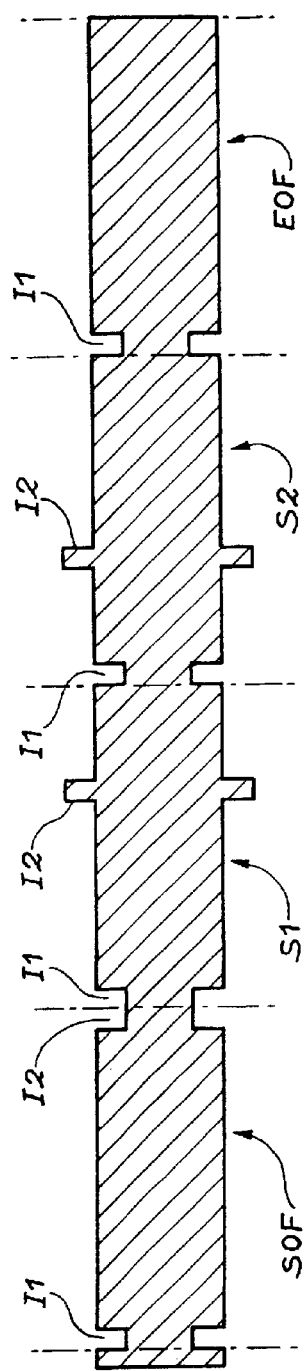
FIG. 2 shows a frame containing a Start Of Frame marker, two information patterns and an End Of Frame marker.

FIG. 2 shows a frame containing two patterns, $S_1$ and $S_2$, relating to two symbols, together with an SOF (Start Of Frame) marker and an EOF (End Of Frame) marker. The SOF marker is made up of a negative polarity first pulse, $I_1$, and a second, also negative polarity, pulse, $I_2$. This polarity combination breaks the information coding rule (which demands opposite polarities), and so the SOF pattern cannot be confused with an information pattern.

In the SOF pattern, $I_2$ should preferably be placed as far as possible from $I_1$, i.e. at the end of the time area, that is to say at distance $NT_c$ from $I_1$, for improved accuracy; however the second pulse, $I_2$, may be placed in a time unit other than the last although it must always be placed in the same unit in order to act as a time base.

The EOF marker only contains a single pulse, $I_1$, which again breaks coding rules and avoids any confusion with an information pattern or SOF marker.

In the variation shown in FIG. 2, the pattern's total length, $T_M$, equals (N+1) $T_c$. This length can be extended by introducing a guard time and/or wait time, as shown in FIGS. 3 and 4.

Figure 3:
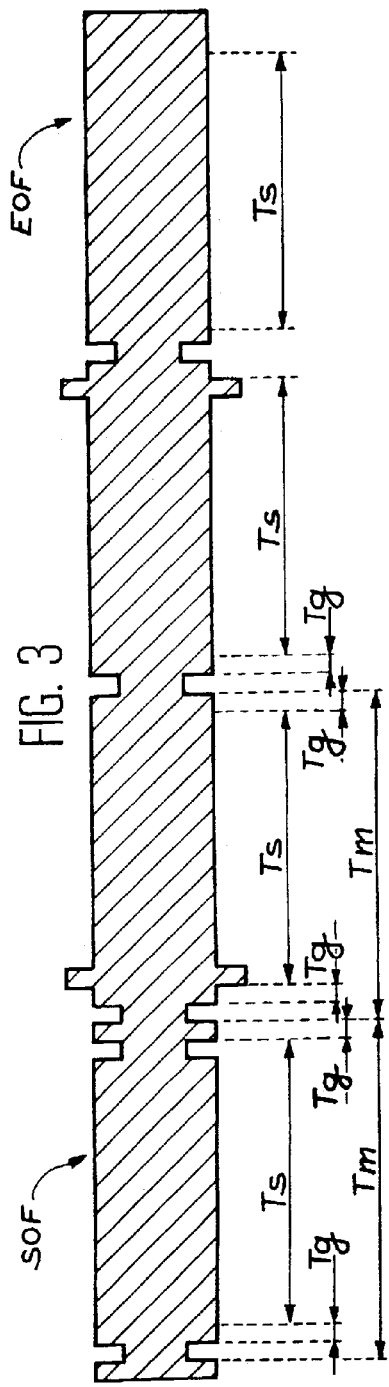
FIG. 3 shows a frame that includes a guard time.

In FIG. 3, firstly, it can be seen that guard times ($T_g$) have been introduced just after the first pulse ($I_1$) and the second pulse ($I_2$). These guard times are not necessarily the same length and can take the values $K_1 T_c$ for the first and $K_2 T_c$ for the second, where $K_1$ and $K_2$ are integers. These guard times extend the pattern's length by $(K_1+K_2)T_c = KT_c$. For example, the following is a possibility: $K_1 = K_2 1$, therefore K=2.

In FIG. 4, a wait time ($T_a$) can also be seen at the end of the pattern. This time may be equal to $pT_c$, where p is an integer. In the example shown, a pattern's length ($T_m$) is therefore $(1+K_1+N+K_2+p)T_c$.

Wait time $T_a$ may be adjusted by the interrogator system with no effect on the tag. It is not necessary to send this time value coded in a message first.

The interrogator system will be able to calculate the wait time according to the application's constraints as described above. Typically, the shorter the transmission distance, the less power is needed for the field of transmission to remotely feed the tag. This reduces the distance that the interrogator system must maintain between the carrier wave amplitude and the transmission's side bands. More power can therefore be used for the transmission spectrum's side bands relative to that used for the carrier wave, so reducing the wait time.

The wait time may also be modified by the interrogator system depending on the message contents or the length of the tag's reply message, to add a random factor if a large number of identical codes are transmitted in succession, in order to avoid banding appearing in the transmission spectrum, on the one hand, and in order to optimise the interlacing of messages sent by the interrogator with those returned by the tag, on the other hand.

For the binary information dataflow, we can take the following values as a purely indicative example, where N=16, K=2 and $T_c 9.4$ µs:

where $T_a = 0 (T_m = 178$ µs): maximum dataflow: 22.4 kbits/s;

where $T_a = 1.94$ ms ($T_m = 2.12$ ms): nominal dataflow 1.89 kbits/s.

An example transaction in which messages transmitted by the interrogator system and messages from the tags are interlaced is shown in FIG. 5. This example represents a bit-by-bit Identification algorithm in which the interrogator system sends a signal marked "DEB-SEQ" [Start of Sequence] that starts an identification sequence, and the tags reply by sending a signal marked "BIP" [Beep] if the bit in position n is set to "1" and sending nothing if the bit in position n is set to "0" The interrogator system replies to the tags by sending a message translating what it received, i.e. either "Lect1" if it received a "BIP" or "Lect0" if it received nothing The tags whose bit state is identical to that read by the interrogator system continue the process with each following bit in turn until the last bit of the tag identification code is reached.

What is claimed is:

1. A method for transmitting information from an interrogator system to portable objects, wherein the information is transmitted through radio carrier wave amplitude modulation over several time intervals, called pulses, and with positional coding of these pulses, comprising:

applying ternary amplitude modulation, wherein a first amplitude level is used with a second amplitude level that is below the first amplitude level, and a third amplitude level that is above the first amplitude level, wherein the ternary amplitude modulation either passes from the first amplitude level to the second amplitude level or from the first amplitude level to the third amplitude level; and forming two opposite-polarity pulses in a same pattern to provide positional coding, wherein a position concerned is that of a second pulse relative to a first pulse.

2. The method of claim 1, wherein the information is grouped into messages made up of a sequence of patterns and each of said patterns is associated with an information symbol and contains a code time area divided into N identical time units, each time unit of length $T_c$, where $T_c$ at least equals a length of a pulse in any of the N time units in the code time area.

3. The method of claim 2, wherein a number N of time units within the code time area equals $2^M$, where M is an integer, and the information symbol transmitted by each pattern comprises a binary word including M bits.

4. The method of claim 2, wherein each message is structured in frames, each frame is made up of a first pattern called a Start Of Frame (SOF) marker comprising:
a first time area divided into N time units;
a first pulse placed before the first time area; and
a second pulse, with the same polarity as the first pulse, placed within the first time area, wherein said Start of Frame (SOF) marker is followed by patterns associated with the information symbols of a message.

5. The method of claim 4, wherein the second pulse of the Start Of Frame (SOF) marker is always placed in a same time unit in the first time area.

6. The method of claim 5, wherein the second pulse of the Start Of Frame (SOF) marker is always placed in a last time unit in the first time area.

7. The method of claim 4, wherein the frame also comprises a last pattern called an End Of Frame (EOF) marker, said End Of Frame (EOF) marker includes a second time area with no pulse and a pulse placed before said second time area.

8. The method of claim 4, wherein a first guard time, a duration of which is a multiple of the time unit, is placed between the first pulse and the end of the first time area.

9. The method of claim 8, wherein a second guard time, a duration of which is a multiple of the time unit, is placed after the first time area.

10. The method of claim 4, wherein the time area is followed by a wait time in each pattern.

11. The method of claim 10, wherein a length of the wait time is modified for different patterns depending on transmission conditions.

12. The method of claim 10, wherein a length of the wait time is modified depending on a length of the messages that the portable objects retransmit.

13. A method as in any one of the preceding claims, wherein the first pulse is of negative polarity.

14. A method according to one of claims 1–12 wherein an amplitude modulation index is lower than 50%.

* * * * *